US012679562B2

(12) United States Patent
Handel et al.

(10) Patent No.: US 12,679,562 B2
(45) Date of Patent: Jul. 14, 2026

(54) MECHANICAL SWITCHING UNIT, SYSTEM AND SATELLITE

(71) Applicant: Tesat-Spacecom GmbH & Co. KG, Backnang (DE)

(72) Inventors: Heiner Handel, Backnang (DE); Bastian Hellweg, Backnang (DE); Daniel Reicherter, Backnang (DE); Erik Rosén, Backnang (DE); Andreas Wacker, Backnang (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 0 days.

(21) Appl. No.: 18/797,850

(22) Filed: Aug. 8, 2024

(65) Prior Publication Data

US 2025/0051040 A1    Feb. 13, 2025

(30) Foreign Application Priority Data

Aug. 10, 2023    (DE) .......................... 102023121347.4

(51) Int. Cl.
B64G 1/22    (2006.01)
(52) U.S. Cl.
CPC .................................. B64G 1/2229 (2023.08)
(58) Field of Classification Search
CPC ....... B64G 1/2229; B64G 1/22; F16D 48/064; F16D 2023/141; F16D 13/752; F16H 63/18; F16H 63/30; G05G 9/085
See application file for complete search history.

(56) References Cited

U.S. PATENT DOCUMENTS

| | | | |
|---|---|---|---|
| 6,374,696 B1 | 4/2002 | Blake, III et al. | |
| 2001/0006921 A1* | 7/2001 | Reik ....................... | F16D 48/02 |
| | | | 477/79 |
| 2003/0094057 A1* | 5/2003 | Bigi ....................... | F16D 28/00 |
| | | | 74/473.37 |

(Continued)

FOREIGN PATENT DOCUMENTS

| | | | |
|---|---|---|---|
| BR | 9606511 A | 6/1998 | |
| CA | 2925912 A1 * | 4/2010 | ............. G16H 40/60 |
| DE | 19627980 A1 | 1/1997 | |

(Continued)

OTHER PUBLICATIONS

Extended European Search Report including Written Opinion for Application No. 24192989.2 dated Jan. 16, 2025. 8 pgs. (see p. 2-3, categorizing the cited references).

*Primary Examiner* — Zakaria Elahmadi
(74) *Attorney, Agent, or Firm* — Lerner David LLP

(57)    ABSTRACT
A mechanical switching unit for selectively moving a functional component from a first position to a second position has an input element, an output element, a first holding point and a second holding point. The input element is set in motion by a drive. The output element is in engagement with the input element and is set in motion by the input element. The input element moves the output element from the first position to the second position, and vice versa. In the process, the functional component is moved from the first position to the second position, and vice versa. The first holding point exerts a first holding force on the functional component in the first position. The second holding point exerts a second holding force on the functional component in the second position.

9 Claims, 2 Drawing Sheets

(56)                    References Cited

U.S. PATENT DOCUMENTS

| | | |
|---|---|---|
| 2007/0131507 A1 | 6/2007 | Bigi |
| 2022/0001811 A1 | 1/2022 | Dzierzak et al. |

FOREIGN PATENT DOCUMENTS

| | | |
|---|---|---|
| DE | 10062533 A1 | 9/2001 |
| DE | 112019005442 T5 | 7/2021 |
| EP | 2990681 B1 | 10/2018 |
| RU | 2046077 C1 | 10/1995 |

* cited by examiner

1

60

10

20, 30

32

15

17

19

18

55

19a

18a

50

100

1

60   10   50

MECHANICAL SWITCHING UNIT, SYSTEM AND SATELLITE

FIELD OF THE INVENTION

The present description relates to a mechanical switching unit with which a functional component can be selectively brought into one of several positions and held in this position. Furthermore, the description relates to a system comprising such a mechanical switching unit and a satellite comprising such a system.

BACKGROUND OF THE INVENTION

Nowadays, complex technical components are used on board spacecraft such as satellites. These technical components are used, for example, to generate, process, modify, transmit and/or receive signals or to switch certain signal paths in an arrangement on board the spacecraft.

For this purpose, it may be necessary to bring a functional component into a predefined position and hold it in this position. With the increasing complexity and performance of technical systems, the requirement for the accuracy of the positioning of functional components is also constantly increasing. For example, it is necessary for an optical component, be it an optical receiver or an optical transmitter or an optical component inserted into an optical path, such as an optical filter, to be brought into a specific position with high accuracy in order to fulfil requirements for the transmission bandwidth and channel quality of an optical transmission path. However, the functional component can also be a high-frequency component that must be switched to one of several positions in a transmission path of high-frequency signals on board the satellite, for example in order to select one of several possible signal paths.

In order to achieve a high degree of accuracy when positioning the functional component, precise drives and/or gearings can be used, for example. However, such precise drives and/or gearings can be susceptible to loads that occur during the launch and/or transport of a satellite into orbit. High accelerations can cause forces to act on the functional component as well as on the drive and/or gearing, thereby introducing play into the kinematics, which has a negative effect on the accuracy of the positioning of the functional component.

BRIEF DESCRIPTION OF THE INVENTION

The problem can therefore be considered that of describing a mechanical switching unit with which a functional component is switched to one of several positions and held in this position reproducibly and with high accuracy.

According to a first aspect, a mechanical switching unit for selectively moving a functional component from a first position to a second position is described. The mechanical switching unit has an input element, an output element, a first holding point and a second holding point. The input element is designed to be set in motion by a drive. The output element engages with the input element and is designed to be set in motion by the input element. The input element engages with the output element in such a way that the output element can be moved from the first position to the second position and vice versa, thereby moving the functional component from the first position to the second position and vice versa. The first holding point is designed to exert a first holding force on the functional component in the first position and to hold the functional component in the first position. The second holding point is designed to exert a second holding force on the functional component in the second position and to hold the functional component in the second position.

The mechanical switching unit preferably also has a housing on which the input element, the output element, the first holding point and the second holding point are arranged. The input element is movably mounted on or in the housing. The output element is also movably mounted on or in the housing. The first holding point and the second holding point are rigidly mounted on the housing.

The first holding point and the second holding point are spatially distanced from one another, so that the functional component is aligned at the first holding point and the second holding point in different positions or has different orientations. The first holding point and the second holding point fulfil the function of a holding surface or a support surface on which the functional component rests in order to be held in the corresponding position by an active holding force, as described further below, in addition to resting on it.

The mechanical switching unit described herein is characterized in particular by the fact that moving the functional component from the first position to the second position or vice versa and holding the functional component in the first position or in the second position are functionally separated from one another. The movement of the functional component is brought about by the input element in co-operation with the output element. Holding in the respective position, on the other hand, is assigned, as a function, to the first holding point or the second holding point.

This design creates a kind of mechanical decoupling between holding the drive in the first or second position and bringing it into the first or second position. This design reduces the load on a drive, particularly when used in space travel, because the forces that occur during take-off have little or no effect on the drive, as it is not the drive and the gearing that hold the functional component in position. Instead, these forces are taken up by the first holding point or the second holding point.

The first holding point and the second holding point are separate from the input element and the output element. When the functional component is in contact with the first holding point or the second holding point, forces acting on the functional component are also absorbed by the first holding point or the second holding point and have little or no effect on the input element and the output element.

However, even if forces act on the input element and the output element and thereby increase a play in the engagement, this has no influence on the accuracy of the positioning of the functional component in the first position and the second position, because the first position and the second position are defined by the first holding point and the second holding point.

This also reduces wear on the drive and/or the switching unit. The first holding point and the second holding point are rigidly and immovably connected to the mechanical switching unit, for example the first holding point and the second holding point are connected to the housing of the switching unit. This also ensures that the functional component to be positioned is held reproducibly with a very high degree of accuracy both in the first position and in the second position and that wear on the drive and/or the switching unit does not affect the accuracy of the positioning of the functional component.

In one embodiment, the input element has a pin and the output element has a slot. The pin engages in the slot in order to transfer a movement of the input element to the output element.

For example, the pin on the input element extends in a direction perpendicular to the plane of movement of the input element.

The input element can perform a translatory or rotatory movement. The input element can, for example, be a driving gear and can be designed for a rotational movement.

If the input element is a driving gear and performs a rotational movement, the pin runs parallel to an axis of rotation of the driving gear.

The output element can also be designed as a gear. In this case, the slot in the driven gear runs in a radial direction.

When the driving gear rotates about its centre axis, the pin is moved on a circular path about the centre axis of the driving gear and guides the driven gear because the pin engages in the slot. During this rotational movement, the pin can move relative to the slot in such a way that the pin moves in a radial direction along the slot, but the driven gear is also set in a rotational movement about its centre axis.

In a further embodiment, the input element is a driving gear, which is designed to perform a rotational movement, and the output element is a driven gear, which is designed to perform a rotational movement.

The driving gear and the driven gear can mesh in the manner of a Geneva drive. In this case, the driving gear drives the driven gear during part of the rotational movement when the driving gear and the driven gear are meshed with each other. In addition to a first state in which the drive gear and the output gear mesh with each other and a movement is transmitted from one to the other, a Geneva drive also has a second state in which the drive gear and the output gear do not mesh with each other. In the second state, the driving gear continues to rotate while the driven gear does not continue to rotate. At a certain point, the pin engages in another slot on the driven gear and guides the driven gear again.

In the present case, this mechanism of the Geneva drive is used to move the functional component by the driving gear setting the driven gear in motion, wherein the driven gear is coupled to the functional component via a shaft and the functional component is also moved.

In particular, the Geneva drive is utilized in such a way that the input element can perform movements in opposite directions, whereby the output element can also be moved in opposite directions in order to move the functional component from the first position to the second position and vice versa.

It is therefore conceivable that the input element and the output element are in engagement with each other in every state of the switching unit. The basic design of the Geneva drive serves to allow play between the input element and the output element so that forces acting on the functional component do not pass through to a drive.

In a further embodiment, the first holding point has a first magnetic element and/or the second holding point has a second magnetic element.

For example, a permanent magnet or an electromagnet can be arranged at the first holding point and/or at the second holding point in order to exert a holding force on a holding element of the functional component and thereby hold the functional component in the corresponding position.

A magnetic element can also be arranged in the holding element of the functional component so that the magnetic element attracts the holding element at the first holding point and the second holding point and exerts a holding force on it. Alternatively or additionally, the holding element can be made of a ferromagnetic material or can comprise a ferromagnetic material.

To move the functional component from the first position or the second position, a drive must first overcome the holding force. As soon as the functional component approaches the other position, the magnetic element exerts an attractive force and pulls the functional component towards the other position. Even if there is a small amount of play between the input element and the output element, the functional component is fixed by the holding force at the first holding point or the second holding point and this holding force does not have to be applied by the engagement between the input element and the output element. Wear on this engagement in particular can mean that the functional component is not held in the same position with high precision due to the resulting play if the holding force is applied by the input element and the output element.

In a further embodiment, the first holding point has a first support surface, wherein the first support surface is designed such that the functional component rests on the first support surface in the first position, and/or the second holding point has a second support surface, wherein the second support surface is designed such that the functional component rests on the second support surface in the second position.

After the corresponding support surfaces are immovable with respect to the housing of the mechanical switching unit, the functional component is held in the first position and the second position with a high degree of accuracy. Even if there is play between the input element and the output element, the holding force exerted by the holding points will repeatedly pull the functional component into the same position with high precision. The accuracy of the positioning of the functional component in the first position and the second position is therefore independent of the accuracy of the drive, which is formed by the input element and the output element.

In a further embodiment, the first holding point has a first recess, wherein the first recess is designed such that the functional component engages in the first recess in the first position, and/or the second holding point has a second recess, wherein the second recess is designed such that the functional component engages in the second recess in the second position.

The first recess and the second recess are arranged, for example, in the housing of the mechanical switching unit at the first holding point or the second holding point or in the vicinity of the first holding point or the second holding point. When the functional component is in the first position, a holding element of the functional component engages in the first recess. In the second position, the holding element of the functional component engages in the second recess. This can contribute to a higher force being required to move the functional component from the first position or the second position.

The two recesses can be provided in addition to or as an alternative to the use of a magnetic element at the first holding point and the second holding point.

It is conceivable that the mechanical switching unit is designed without fixed contact surfaces, but only with recesses. For example, several recesses can be arranged at predetermined points along a line of movement of the functional component. This allows the functional component to be switched from one recess to the next without reversing direction. For example, the functional component can perform a rotational movement.

In a further embodiment, the input element is coupled to the output element in such a way that the output element can be moved in two opposite directions.

The output element can thus move the functional component from the first position to the second position and from the second position back to the first position. This can be done, for example, by moving a drive coupled to the input element in different directions.

According to a further aspect, a system is disclosed which comprises a mechanical switching unit as described herein, a drive and a functional component. The drive is coupled to the input element such that a movement of the drive is transmitted to the input element. The functional component is coupled to the output element in such a way that a movement of the output element is transmitted to the functional component.

The drive is, for example, an electromechanical drive, such as an electric motor. Alternatively, it is conceivable that the drive is a hydraulic or pneumatic system. The drive basically provides a movement that is transmitted to the input element. The drive can perform a rotary movement or a translatory movement and can be coupled to a rotary shaft of the input element, for example.

The functional component can also be arranged on a rotary shaft of the output element. When the output element rotates about the rotary shaft, the functional component is entrained with this rotational movement. A holding element is arranged on the functional component and interacts with the first holding point and the second holding point (as well as the associated contact surfaces and recesses) as described above.

In one embodiment, the functional component is an optical element or a high-frequency component.

The optical element can be, for example, an optical filter, emitter or an optical receiver, which must be brought into a certain position and/or orientation and held precisely in this position and/or orientation. In general terms, the optical element can be an optical component that can influence the geometric and/or spectral properties of an optical beam. In the case of a high-frequency component, this can be brought into different positions, for example in order to switch different signal paths.

In a further aspect, there is disclosed a satellite comprising a system as described herein.

The design of the mechanical switching unit described here can be used advantageously in space travel, because high and repeatable precision in positioning is required for certain functional components (for example optical elements or high-frequency components), but high forces can act during the launch and/or transport of a spacecraft, which can lead to wear in the mechanical components of a switching unit.

The switching unit described here uses various structural elements for the two tasks of moving and holding the functional component. For moving, an actuator is used in conjunction with an input element and an output element. Static holding points are used for holding. This means that any play in the kinematics of the switching unit does not affect the positioning accuracy in the first position and the second position. Forces that occur during the launch and/or transport of a satellite into orbit can therefore at most affect the play in the kinematics (drive, input element, output element), but this has little or no effect on the positioning accuracy at the first holding point and/or the second holding point. The first holding point and the second holding point are preferably arranged on the housing of the mechanical switching unit and have a strength such that the holding points are not plastically deformed by the forces occurring during start-up and/or transport.

BRIEF DESCRIPTION OF THE DRAWINGS

Some details are described in greater detail below using the enclosed drawings. The illustrations are schematic and not to scale. Like reference signs refer to like or similar elements. The drawings show.

DETAILED DESCRIPTION

Figure 1:
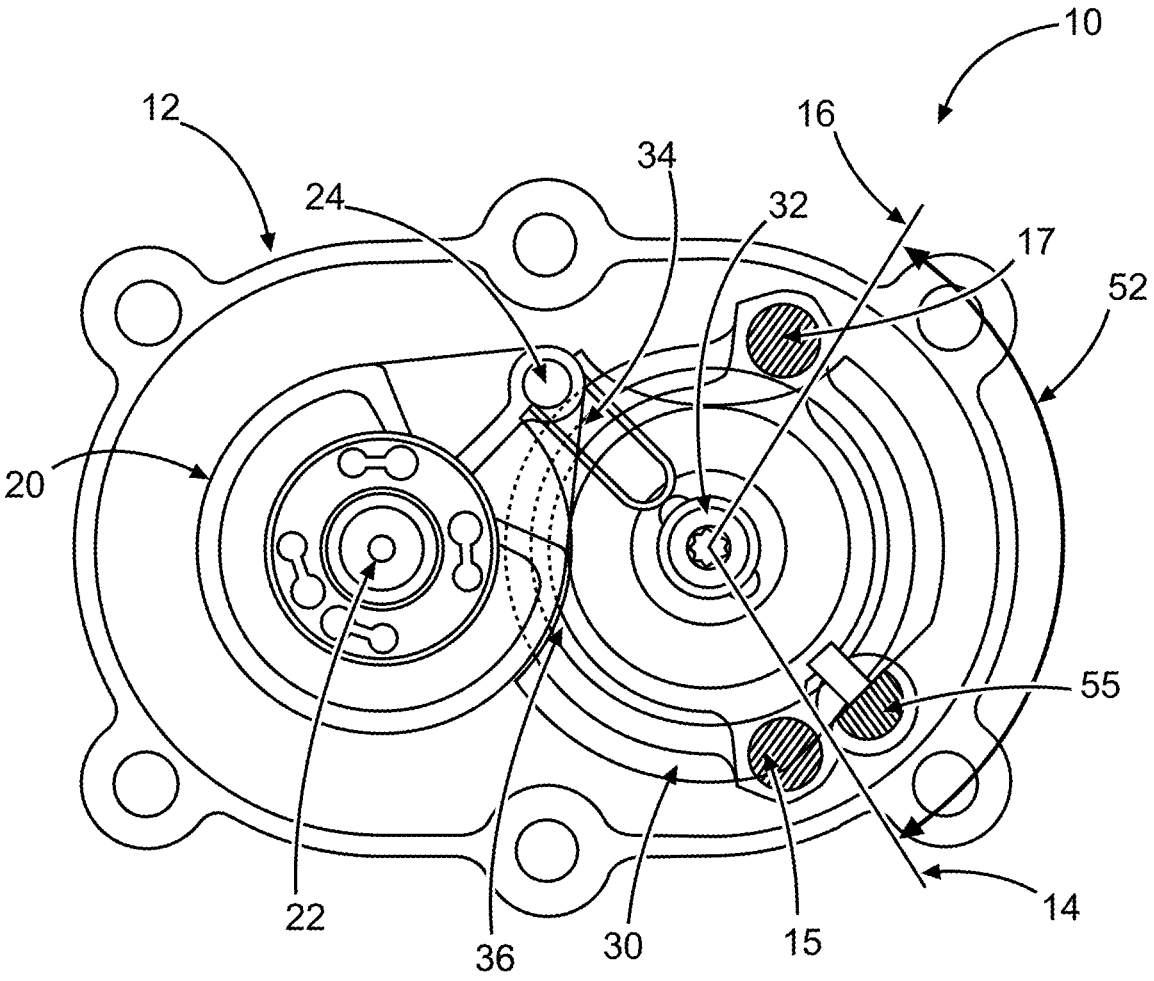
FIG. 1 a schematic representation of a mechanical switching unit.

FIG. 1 shows a mechanical switching unit 10. The mechanical switching unit 10 has a housing 12. The remaining components are arranged on the housing 12. The mechanical switching unit 10 has an input element 20, which can also be referred to as an input. Furthermore, the mechanical switching unit 10 has an output element 30, which can also be referred to as an output.

The input element 20 is designed as a driving gear and is connected to the housing 12 via a rotary shaft 22. The input element 20 is designed to rotate about the rotary shaft 22, wherein the rotary shaft 22 also represents a centre axis of the input element 20. The input element 20 has a pin 24. At least in portions, the input element 20 is adjacent to a contour 36 of the output element 30.

The output element 30 is also designed as a driven gear and is connected to the housing 12 via a drive shaft 32. The drive shaft 32 forms the centre axis of the rotary movement of the output element 30 and connects the output element 30 to the functional component. The output element 30 has a radial slot 34.

The pin 24 engages in the slot 34. This means that the input element 20 and the output element 30 engage with each other. When the input element 20 rotates clockwise in the illustration shown, the pin 24 guides the output element 30. The pin 24 also performs a relative movement in the slot 34 and approaches the centre axis 32. The output element 30 performs an anti-clockwise rotational movement and guides the functional component during this rotational movement.

A first holding point 15 and a second holding point 17 are arranged on the housing 12. As shown, the functional component can assume a first position 14 when it is in contact with the first holding point 15. The functional component assumes a second position 16 when it is in contact with the second holding point 17. The holding element 55, which is part of the functional component (see FIG. 2), is shown as representative of the functional component in the illustration in FIG. 1.

In the state shown in FIG. 1, the holding element 55 is in contact with the first holding point 15 and is in the first position 14. When the output element 30 rotates anti-clockwise, the functional component also rotates anti-clockwise and the holding element 55 moves along the direction of movement 52 from the first position 14 to the second position 16. In the second position 16, the holding element 55 is in contact with the second holding point 17.

The input element 20 and the output element 30 can move in opposite directions. In the example of FIG. 1, this would therefore be clockwise or anti-clockwise, so that the holding element 55 of the functional component can also move in both directions along the direction of movement 52 in order to bring the functional component optionally into the first position 14 or the second position 16.

This design means that the kinematics with input element 20 and output element 30 move the holding element 55 and the functional component from the first position 14 to the second position 16, or vice versa, wherein in the first position and the second position the respective holding point 15, 17 exerts a holding force on the holding element 55 and holds the functional component in this position. Thus, despite play in the kinematics between the input element 20 and the output element 30, the functional component can be held in the corresponding position with repeatable and high precision.

Figure 2:
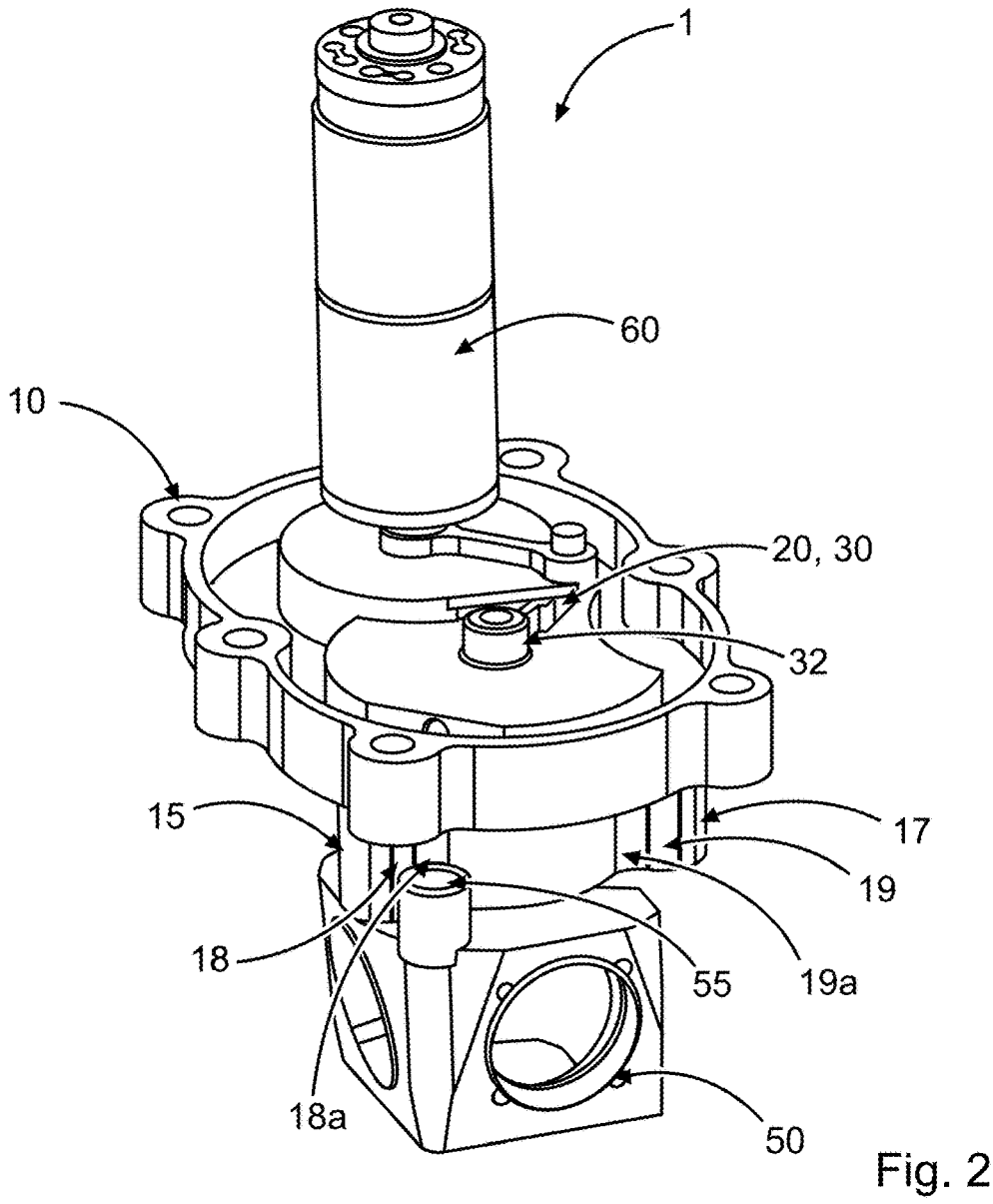
FIG. 2 a schematic representation of a system with a drive, a mechanical switching unit and a functional component.

FIG. 2 shows a system 1 with a mechanical switching unit 10, as shown in FIG. 1, as well as a drive 60 and a functional component 50.

The drive 60 is, for example, an electric motor which is coupled to the rotary shaft 22 of the input element 20 (see FIG. 1). When the drive 60 causes the input element 20 to rotate, the corresponding movement is transmitted to the output element 30. The drive shaft 32 then rotates the functional component 50.

The functional component 50 can be moved in such a way that the holding element 55 moves between the first holding point 15 and the second holding point 17. In the first position, the holding element 55 rests against the first holding point 15. In particular, the holding element 55 is in contact with the first support surface 18. The first support surface 18 is part of the first holding point 15. The illustration in FIG. 2 shows the functional component 50 and the holding element 55 in the first position. In the second position, the holding element 55 rests against the second holding point 17, in particular the second support surface 19.

A recess 18a is arranged in the vicinity of the first holding point 15. When the functional component 50 is in the first position, the holding element 55 lies in the recess 18a and is additionally held in the first position by the first holding point 15, for example a magnetic element. There is also a recess 19a in the vicinity of the second holding point 17. In the second position, the holding element 55 lies in the recess 19a and is also additionally held in the second position by the second holding point 17, for example a magnetic element.

The system 1 in FIG. 2 can be described as follows in an exemplary application:

The system relates to the realization of kinematics that enable rotation and precise positioning of functional components such as optical components and RF elements. The system utilizes the principle of a Geneva drive 20, 30, which allows mechanical decoupling of the drive 60 in the end positions 14, 16 from the moving part (the functional component 50), in combination with a magnetic stop or detent system formed by the stop points 15, 17 and the recesses 18a, 19a. The functions of moving and positioning are separated. The combination of these two special approaches enables the position of the functional component 50 to be held precisely and reproducibly regardless of the accuracy of the drive 60 in conjunction with the gearing 20, 30.

The drive shaft 22 and the rotor shaft 32 are arranged in parallel and connected to each other via a Geneva drive 20, 30. The two functions of moving and holding are separated from each other. The rotary movement is realized by the drive 60 with the driving gear 20 and the driven gear 30.

Precise holding is realized by a magnetic stop or detent system, namely the holding points 15, 16 in conjunction with the holding element 55.

The Geneva drive 20, 30 is used to separate the functions. The Geneva drive 20, 30 ensures that the rotary movement of the drive shaft 22 is transmitted to the rotor shaft 32 as a stepwise movement. The Geneva drive 30 is a disc-shaped component with one or more slots 34, wherein in the example of FIG. 2 there is only one slot 34. This disc is mounted on the rotor shaft 32. The drive shaft 22 drives an eccentrically mounted pin 24. When the drive shaft 22 is rotated, the pin 23 moves along the slot 34 and rotates the Geneva drive 30 one step further. Contrary to the usual design of Geneva drives, the play between the pin 24 and the slot 34 is deliberately large in this application, as the final positioning of the functional component 50 is carried out by the magnetic stop or detent system.

After the functional component 50 has been moved into a desired position by the Geneva drive 20, 30, the drive can still be rotated into a rest position in which the pin 24 is no longer in engagement with the slot 34. Switching to the second position is achieved by reversing the direction of rotation. The magnetic stop or detent system holds the functional component 50 precisely in position. In the event of strong external loads (e.g. vibrations), the functional component 50 can only briefly move out of position within the play range due to a locking contour 36 of the Geneva drive. The exact position of the functional component 50 is then re-adjusted by the magnetic stop or detent system.

If a magnetic detent system is used instead of magnetic stops, switching is possible without reversing direction, but with lower positioning accuracy.

In the example shown in FIG. 2, the gearing enables the functional component 50 to be rotated by 90°. Exact positioning is achieved via magnetic stops 15, 17. Separating the moving and holding functions makes it possible to use a drive 60 and a gearing 20, 30 with low accuracy requirements.

The concept can also be applied to other angles and a greater number of positions.

The magnetic stop or detent system 15, 16 enables the very high required accuracies to be achieved. A cost-effective drive 60 with low accuracy requirements can be used. The gearing play between the input element 20 and the output element 30 has no effect on the positioning or orientation of the functional component 50 in the first position or the second position. Due to the play in the coupling, the mechanical switching unit is also robust against assembly tolerances. In de-energized operation, the drive 60 can be decoupled without affecting the holding force at the first and second holding points 15, 17. After switching the functional component 50 from the first position to the second position (or vice versa), the drive train is decoupled from the functional component 50 and does not act on the functional component 50 under starting loads. The locking contour 36 of the Geneva drive prevents twisting under high mechanical loads.

Figure 3:
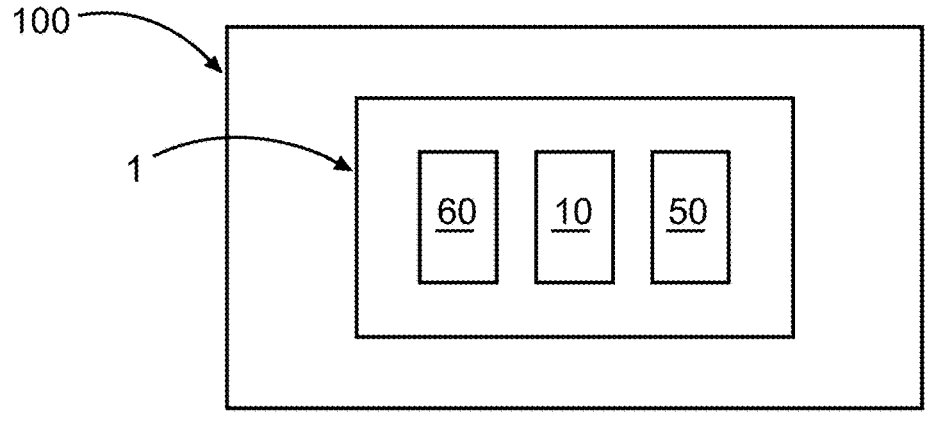
FIG. 3 a schematic representation of a satellite.

FIG. 3 schematically shows a satellite 100 in which a system 1 is arranged as described in FIG. 2 in order to position a functional component 50 on board the satellite and hold it in a desired position.

In addition, it should be noted that "comprising" or "including" does not exclude other elements or steps and "one" or "a" does not exclude a plurality. Furthermore, it should be noted that features or steps described with reference to one of the above exemplary embodiments may also be used in combination with other features or steps of other exemplary embodiments described above. Reference signs in the claims are not to be regarded as a limitation.

LIST OF REFERENCE SIGNS 1 system
10 mechanical switching unit
12 housing
14 first position
15 first holding point
16 second position
17 second holding point
18 first support surface
18a first recess
19 second support surface
19a second recess
20 input element, input
22 rotary shaft, centre axis
24 pin
30 output element, output
32 drive shaft, centre axis
34 slot, engagement
36 contour
50 functional component
52 direction of movement
55 holding element
60 drive
100 satellite

The invention claimed is:

1. A mechanical switching unit for selectively moving a functional component from a first position to a second position, the mechanical switching unit comprising:

a housing;

an input element configured to be set in motion by a drive;

an output element in engagement with the input element and configured to be set in motion by the input element;

a first holding point;

a second holding point;

wherein the input element is engaged with the output element such that the output element is movable from the first position to the second position and vice versa, thereby moving the functional component from the first position to the second position and vice versa;

wherein the first holding point is configured to exert a first holding force on the functional component in the first position and to hold the functional component in the first position;

wherein the second holding point is configured to exert a second holding force on the functional component in the second position and to hold the functional component in the second position, wherein each of the first holding point and the second holding point are separate from the input element and the output element;

wherein, in the first position or in the second position, a force acting on the functional component is absorbed by the first holding point or the second holding point, respectively, and the functional component is mechanically decoupled from the input element and the output element, thereby reducing the mechanical load applied by the functional component onto the input element and the output element, wherein the first holding point is arranged at the housing;

wherein the second holding point is arranged at the housing;

wherein the first holding point has a first support surface, wherein the first support surface is configured such that the functional component rests on the first support surface in the first position; and wherein the second holding point has a second support surface, wherein the second support surface is configured such that the functional component rests on the second support surface in the second position.

2. The mechanical switching unit according to claim 1, wherein the input element has a pin;

wherein the output element has a slot; and wherein the pin engages in the slot in order to transmit a movement of the input element to the output element.

3. The mechanical switching unit according to claim 1, wherein the input element is a driving gear configured to perform a rotational movement;

wherein the output element is a driven gear configured to perform a rotational movement.

4. The mechanical switching unit according to claim 1, wherein the first holding point comprises a first magnetic element; and/or wherein the second holding point comprises a second magnetic element.

5. The mechanical switching unit according to claim 1, wherein the first holding point comprises a first recess, wherein the first recess is configured such that the functional component engages in the first recess in the first position; and/or wherein the second holding point has a second recess, wherein the second recess is configured such that the functional component engages in the second recess in the second position.

6. The mechanical switching unit according to claim 1, wherein the input element is coupled to the output element in such a way that the output element can be moved in two opposite directions.

7. A system comprising:

a mechanical switching unit according to claim 1;

a drive;

the functional component;

wherein the drive is coupled to the input element in such a way that a movement of the drive is transmitted to the input element; and wherein the functional component is coupled to the output element in such a way that a movement of the output element is transmitted to the functional component.

8. The system according to claim 7, wherein the functional component is an optical element or a high-frequency component.

9. A satellite comprising a system according to claim 7.

* * * * *